US012611928B2

(12) United States Patent
Nagai et al.

(10) Patent No.: US 12,611,928 B2
(45) Date of Patent: Apr. 28, 2026

(54) WORKING VEHICLE

(71) Applicant: Kubota Corporation, Osaka (JP)

(72) Inventors: Kotaro Nagai, Sakai (JP); Yuichi Nakamukai, Sakai (JP); Ryoma Iwase, Sakai (JP); Takanori Ito, Sakai (JP)

(73) Assignee: KUBOTA CORPORATION, Osaka (JP)

( * ) Notice: Subject to any disclaimer, the term of this patent is extended or adjusted under 35 U.S.C. 154(b) by 0 days.

(21) Appl. No.: 18/981,883

(22) Filed: Dec. 16, 2024

(65) Prior Publication Data

US 2025/0206131 A1     Jun. 26, 2025

(30) Foreign Application Priority Data

Dec. 22, 2023   (JP) ................................. 2023-216819

(51) Int. Cl.
| | |
|---|---|
| B60K 25/02 | (2006.01) |
| F16H 59/36 | (2006.01) |
| F16H 59/68 | (2006.01) |
| F16H 61/04 | (2006.01) |
| F16H 61/30 | (2006.01) |
(Continued)

(52) U.S. Cl.
CPC ............. B60K 25/02 (2013.01); F16H 59/36 (2013.01); F16H 59/68 (2013.01); F16H 61/0403 (2013.01); F16H 61/30 (2013.01); F16H 63/04 (2013.01); F16H 63/32 (2013.01); B60K 2025/024 (2013.01); F16H 2059/366 (2013.01); F16H 2200/0034 (2013.01)

(58) Field of Classification Search
CPC .. B60K 25/02; B60K 2025/024; B60K 17/28; F16H 59/68; F16H 61/0403; F16H 2200/0004; F16H 2037/0886; F16H 63/32
See application file for complete search history.

(56) References Cited

U.S. PATENT DOCUMENTS 6,854,541 B2 *  2/2005  Matufuji ................ B60K 17/28
                                              74/606 R
2023/0018536 A1   1/2023  Viitasalo et al.

FOREIGN PATENT DOCUMENTS

CN      118302620 A *  7/2024 ............. F16H 61/30
DE    102011084623 A1    4/2013
(Continued)

OTHER PUBLICATIONS

Computer generated English translation of Chinese Patent 118302620 (Year: 2025).*

(Continued)

*Primary Examiner* — Paul N Dickson
*Assistant Examiner* — Tiffany L Webb
(74) *Attorney, Agent, or Firm* — Keating & Bennett, LLP

(57) ABSTRACT
A working vehicle includes a PTO shaft to extract power of a prime mover to an outside, a first PTO transmission shaft to receive power from the prime mover, a second PTO transmission shaft to transmit power to the PTO shaft, a first gear train and a second gear train to transmit power from the first PTO transmission shaft to the second PTO transmission shaft, and a synchromesh switching mechanism to switch power transmission from the first PTO transmission shaft to the second PTO transmission shaft between a first mode where the power transmission is performed via the first gear train and a second mode where the power transmission is performed via the second gear train.

6 Claims, 10 Drawing Sheets

(51) Int. Cl.
    *F16H 63/04*        (2006.01)
    *F16H 63/32*        (2006.01)

(56)         References Cited

FOREIGN PATENT DOCUMENTS

| EP | 2857246 | A2 | 4/2015 |
|----|---------|----|--------|
| EP | 3742023 | A1 | 11/2020 |
| JP | 2020189532 | A | 11/2020 |

OTHER PUBLICATIONS

Official Communication issued in corresponding European Patent Application No. 24220156.4, mailed on May 8, 2025, 7 pages.

\* cited by examiner

WORKING VEHICLE

CROSS REFERENCE TO RELATED APPLICATIONS

This application claims the benefit of priority to Japanese Patent Application No. 2023-216819, filed on Dec. 22, 2023. The entire contents of this application are hereby incorporated herein by reference.

BACKGROUND OF THE INVENTION

1. Field of the Invention

The present invention relates to working vehicles.

2. Description of the Related Art

A known working vehicle in the related art is disclosed in Japanese Unexamined Patent Application Publication No. 2020-189532.

The working vehicle disclosed in Japanese Unexamined Patent Application Publication No. 2020-189532 includes a power take-off (PTO) shaft that extracts the power of a prime mover to the outside, and also includes a PTO power transmitting system (PTO-transmitting-direction downstream-transmitting structure 350) that transmits the power of the prime mover to the PTO shaft. The PTO power transmitting system includes a PTO transmission mechanism (PTO multistage transmission mechanism 370).

The PTO transmission mechanism includes a first gear train and a second gear train that transmit power to a second PTO transmission shaft, which transmits the power to the PTO shaft, from a first PTO transmission shaft that receives the power of the prime mover. The PTO transmission mechanism is configured to switch the power transmission from the first PTO transmission shaft to the second PTO transmission shaft between a first mode where the power transmission is performed via the first gear train and a second mode where the power transmission is performed via the second gear train.

SUMMARY OF THE INVENTION

There are demands in the related art to perform a transmission operation of the PTO-based power transmitting system by electronic control using a switch.

In view of the aforementioned problem, example embodiments of the present invention provide working vehicles that each perform a transmission operation of a PTO power transmitting system by electronic control using a switch.

A working vehicle according to an example embodiment of the present invention includes a PTO shaft to extract power of a prime mover to an outside, a first PTO transmission shaft to receive power from the prime mover, a second PTO transmission shaft to transmit power to the PTO shaft, a first gear train and a second gear train to transmit power from the first PTO transmission shaft to the second PTO transmission shaft, and a synchromesh switching mechanism to switch power transmission from the first PTO transmission shaft to the second PTO transmission shaft between a first mode where the power transmission is performed via the first gear train and a second mode where the power transmission is performed via the second gear train.

The working vehicle may include a shift fork to perform a switching operation of the synchromesh switching mechanism to switch the power transmission between the first mode and the second mode, an operation mechanism to operate the shift fork to cause the shift fork to perform the switching operation of the synchromesh switching mechanism, a switch operable to output an operational signal to operate the operation mechanism, and a controller configured or programmed to, when acquiring the operational signal from the switch, output a control signal to actuate the operation mechanism.

The first gear train may be configured to transmit the power to the PTO shaft when a rotation speed of the prime mover is a first rotation speed. The second gear train may be configured to transmit the power to the PTO shaft when the rotation speed of the prime mover is a second rotation speed different from the first rotation speed. A gear ratio of the first gear train and a gear ratio of the second gear train may be such that a rotation speed of the PTO shaft when the rotation speed of the prime mover is the first rotation speed is equal or substantially equal to a rotation speed of the PTO shaft when the rotation speed of the prime mover is the second rotation speed.

The controller may be configured or programmed to, when acquiring the operational signal from the switch, switch the rotation speed of the prime mover to the first rotation speed or the second rotation speed and output the control signal to the operation mechanism to switch the power transmission to the first mode or the second mode depending on whether the rotation speed of the prime mover is the first rotation speed or the second rotation speed.

The operation mechanism may include a shift cylinder to move the shift fork to perform the switching operation, and a transmission valve to be controlled in accordance with the control signal to actuate the shift cylinder.

The shift cylinder may include a cylinder body and a piston rod to protrude and retract relative to the cylinder body. The shift fork may include a connector to be connected to the piston rod via a connection pin.

The working vehicle may include a detection sensor to detect a position of the shift fork. The shift fork may include a detectable portion that is movable between a first operational position and a second operational position and is to be detected by the detection sensor to enable the detection sensor to detect whether the shift fork is in the first operational position or the second operational position. The first operational position may be a position where the power transmission from the first PTO transmission shaft to the second PTO transmission shaft is switched to the first mode by the synchromesh switching mechanism. The second operational position may be a position where the power transmission from the first PTO transmission shaft to the second PTO transmission shaft is switched to the second mode by the synchromesh switching mechanism.

The above and other elements, features, steps, characteristics and advantages of the present invention will become more apparent from the following detailed description of the example embodiments with reference to the attached drawings.

BRIEF DESCRIPTION OF THE DRAWINGS

A more complete appreciation of example embodiments of the present invention and many of the attendant advantages thereof will be readily obtained as the same becomes better understood by reference to the following detailed description when considered in connection with the accompanying drawings described below.

FIG. 5 is a front sectional view illustrating a shift fork, an operation mechanism, and the like.

FIG. 6 is a plan view illustrating the shift fork, the operation mechanism, and the like.

FIG. 7 is a perspective view illustrating the shift fork, the operation mechanism, and the like.

DETAILED DESCRIPTION OF THE EXAMPLE EMBODIMENTS

Figure 1:
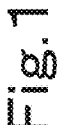
FIG. 1 is a side view of a working vehicle.

Example embodiments will now be described with reference to the accompanying drawings, wherein like reference numerals designate corresponding or identical elements throughout the various drawings. The drawings are to be viewed in an orientation in which the reference numerals are viewed correctly.

Example embodiments of the present invention will be described below while referring to the drawings, as appropriate.

FIG. 1 illustrates a side view of a working vehicle 1 according to this example embodiment. In this example embodiment, a tractor is illustrated as an example of the working vehicle 1. Although the working vehicle 1 is described as being a tractor below, the working vehicle 1 is not limited to a tractor.

As illustrated in FIG. 1, the tractor 1 includes an operator's seat 2 where an operator sits.

In the following description, a direction extending forward (direction of an arrow A1 in FIG. 1) from the operator sitting in the operator's seat 2 will be described as a forward direction, and a direction extending rearward (direction of an arrow A2 in FIG. 1) from the operator will be described as a rearward direction. A direction extending leftward (toward the viewer of FIG. 1) from the operator will be described as a leftward direction, and a direction extending rightward (away from the viewer of FIG. 1) will be described as a rightward direction.

A direction indicated by an arrow K1 in FIG. 1 will be described as a front-rear direction. A horizontal direction orthogonal to the front-rear direction K1 will be described as a vehicle-body width direction. In the vehicle-body width direction, a direction extending from the middle to the right or the left of the tractor 1 will be described as a vehicle-body-width outward direction. In the vehicle-body width direction, a direction extending from the right or the left of the tractor 1 to the middle of the tractor 1 will be described as a vehicle-body-width inward direction.

As illustrated in FIG. 1, the tractor 1 includes a vehicle body 3, front wheels 4 disposed at the left and right of a front portion of the vehicle body 3, rear wheels 5 disposed at the left and right of a rear portion of the vehicle body 3, and an operation portion 7 disposed higher than the vehicle body 3 and including a steering wheel 6, the operator's seat 2, and the like. The front wheels 4 are steered wheels that are steerable. In this example embodiment, the front wheels 4 and the rear wheels 5 are drive wheels that are drivable. The drive wheels may be the rear wheels 5 alone, or may be the front wheels 4 alone. The front wheels 4 and the rear wheels 5 define a traveling device that supports the vehicle body 3 in a travelable manner.

As illustrated in FIG. 1, the vehicle body 3 includes an engine (prime mover) 8 as a power source, a front frame coupled to the engine 8 and protruding forward from the engine 8, and a power transmitting case 10 coupled to a rear portion of the engine 8 and extending rearward from the engine 8. A PTO shaft 9 that extracts power of the engine 8 to the outside is disposed at a rear portion of the power transmitting case 10 (vehicle body 3).

In this example embodiment, the engine 8 is a diesel engine. The engine 8 may be a gasoline engine. The power source may be a prime mover other than an engine. For example, the power source may be an electric motor.

Figure 2:
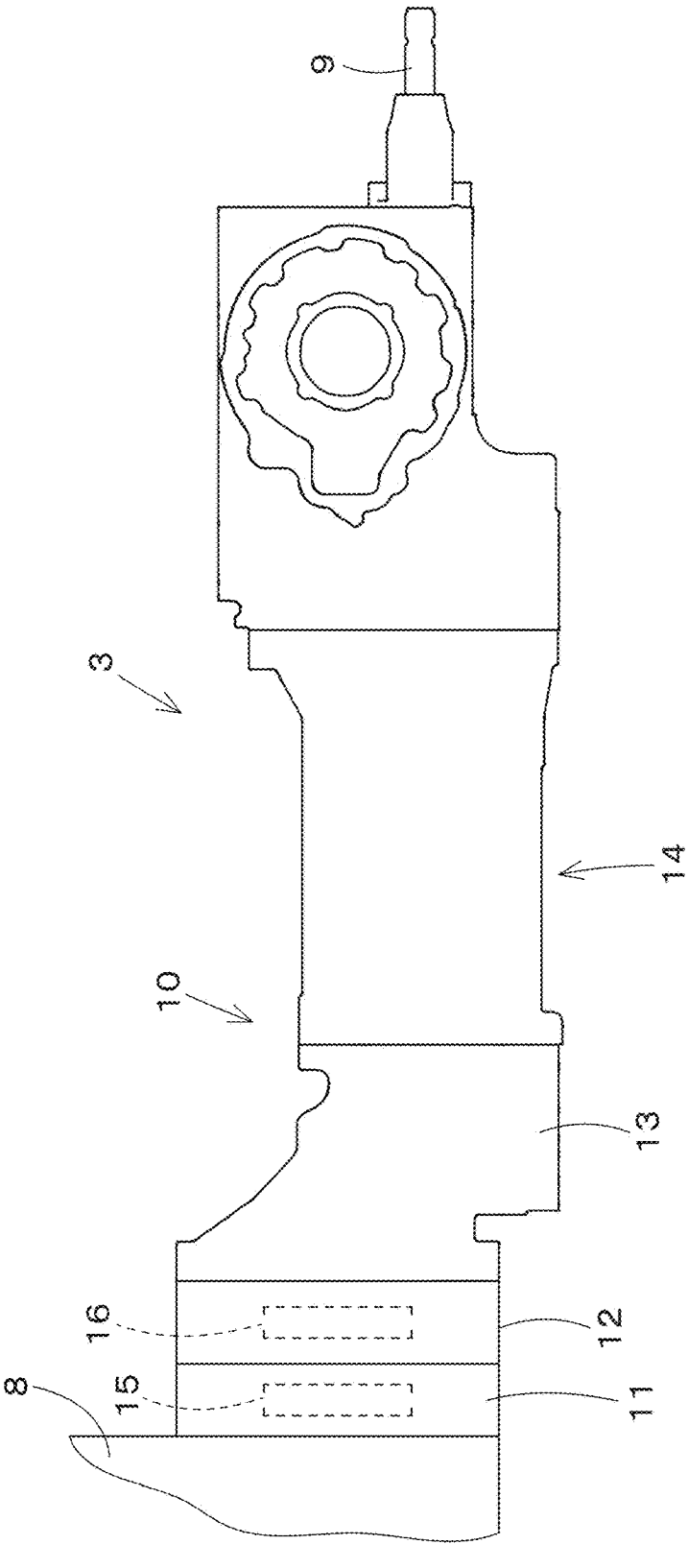
FIG. 2 is a side view of a power transmitting case.

As illustrated in FIG. 2, the power transmitting case 10 includes a flywheel housing 11 coupled to the rear portion of the engine 8, a clutch housing 12 coupled to a rear portion of the flywheel housing 11, a continuously-variable-transmission case 13 coupled to a rear portion of the clutch housing 12, and a transmission case 14 coupled to a rear portion of the continuously-variable-transmission case 13.

The flywheel housing 11 accommodates a flywheel 15 that rotates integrally with a crankshaft of the engine 8. The clutch housing 12 accommodates a main clutch 16 that intermittently transmits the power of the engine 8 transmitted via the flywheel 15. The continuously-variable-transmission case 13 accommodates a hydraulic pump (called an HST pump) 18 and a hydraulic motor (called an HST motor) 19 that are components of a continuously variable transmission (hydro-static continuously variable transmission (HST)) 17. The transmission case 14 accommodates a travel-related transmitting mechanism (see FIG. 3) 20 that speed-changes power output from the continuously variable transmission 17 and transmits the power to the drive wheels.

Figure 3:
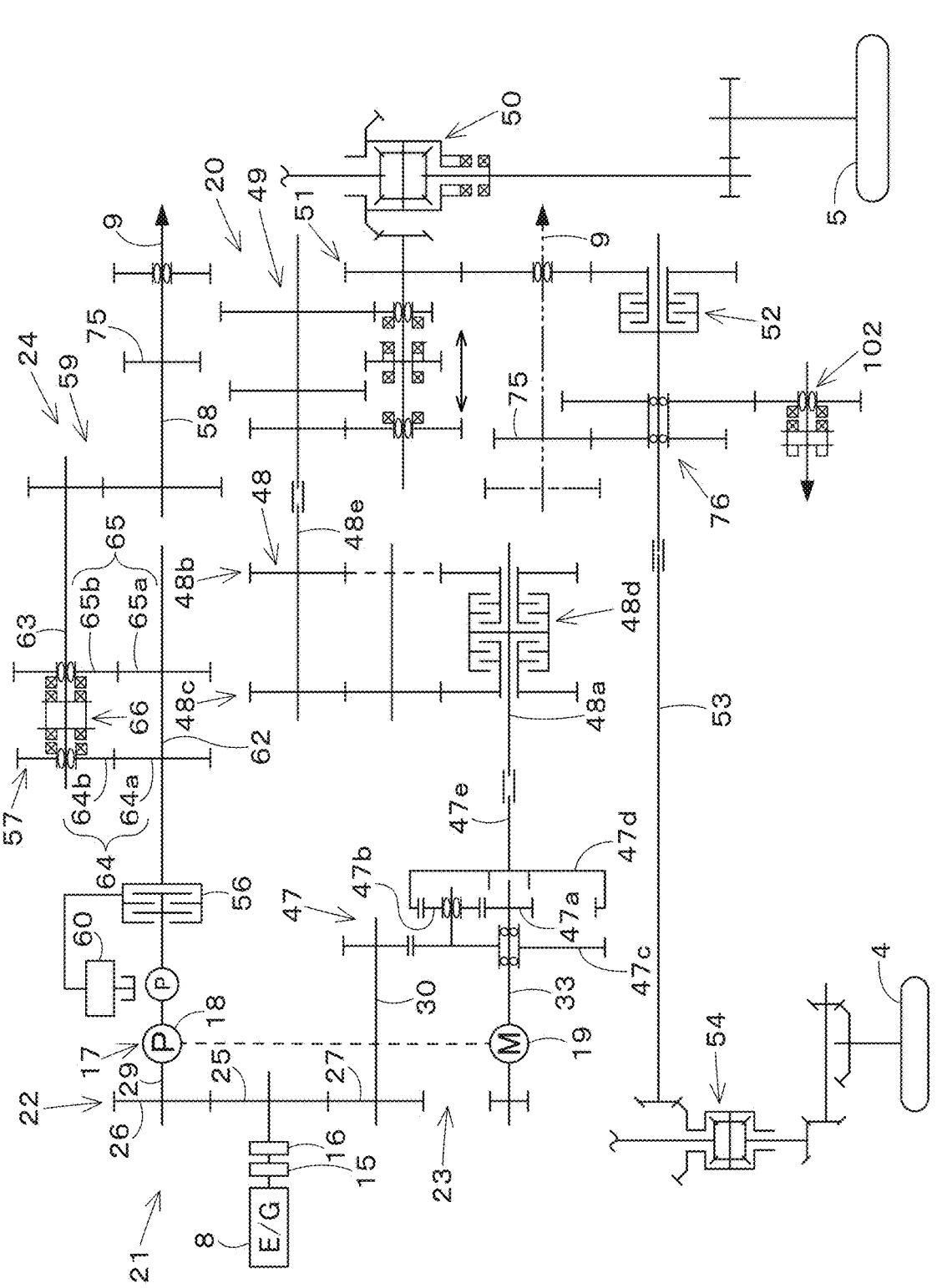
FIG. 3 is a power transmitting system diagram illustrating a power transmitting system of an engine.

FIG. 3 illustrates a power transmitting system 21 that transmits the power of the engine 8. The power transmitting system 21 includes a transmitting mechanism 22 that distributively transmits the power of the engine 8, a travel-related power transmitting system 23 that transmits the power of the engine 8 to the drive wheels (the front wheels 4 and/or the rear wheels 5), and a PTO power transmitting system 24 that transmits the power of the engine 8 to the PTO shaft 9.

As illustrated in FIG. 3, the transmitting mechanism 22 includes an input gear 25 and a pair of transmitting gears 26 and 27. The power of the engine 8 after the flywheel 15 and the main clutch 16 is transmitted to the input gear 25. The input gear 25 meshes with the pair of transmitting gears 26 and 27 and transmits the power to the pair of transmitting gears 26 and 27. The first transmitting gear 26 as one of the gears in the pair of transmitting gears 26 and 27 rotates integrally with a first transmitting shaft 29. The second transmitting gear 27 as the other one of the gears in the pair of transmitting gears 26 and 27 rotates integrally with a second transmitting shaft 30.

As illustrated in FIG. 3, the travel-related power transmitting system 23 includes a continuously variable transmission 17 to which the power from the engine 8 is transmitted, and the travel-related transmitting mechanism 20 that speed-changes the power output from the continuously variable transmission 17 and transmits the power to the drive wheels.

As illustrated in FIG. 3, the travel-related transmitting mechanism 20 includes a planetary gear mechanism 47, a forward-rearward-travel switching mechanism 48, and a secondary transmission mechanism 49.

The planetary gear mechanism 47 includes a sun gear 47a, a plurality of planetary gears 47b provided around the sun gear 47a, a carrier 47c that rotatably supports each planetary gear 47b, a ring gear 47d that meshes with the plurality of planetary gears 47b, and an output shaft 47e that outputs power.

Rotational power output from a motor shaft 33 of the HST motor 19 is input to the sun gear 47a. Rotational power of the second transmitting shaft 30 is input to the carrier 47c. The planetary gear mechanism 47 combines a driving force from the continuously variable transmission 17 with a driving force from the engine 8 not affected by a speed-changing operation of the continuously variable transmission 17, and outputs the combined driving force from the output shaft 47e to an input shaft 48a of the forward-rearward-travel switching mechanism 48.

The forward-rearward-travel switching mechanism 48 outputs the driving force transmitted to the input shaft 48a from either of a forward-travel output gear train 48b that transmits forward-travel power and a rearward-travel gear train 48c that transmits rearward-travel power. The forward-rearward-travel switching mechanism 48 includes a switch clutch 48d that switches the power transmitting mode between a forward-travel-power transmitting mode and a rearward-travel-power transmitting mode.

The secondary transmission mechanism 49 switches power output from an output shaft 48e of the forward-rearward-travel switching mechanism 48 to any of a lower speed mode, an intermediate speed mode, and a high speed mode, and outputs the power. The power output from the secondary transmission mechanism 49 is transmitted to the rear wheels 5 via a rear-wheel differential mechanism 50. The power output from the secondary transmission mechanism 49 is transmitted to the front wheels 4 via a front-wheel-power extracting gear train 51, a clutch mechanism 52, a front-wheel-power transmitting shaft 53, a front-wheel differential mechanism 54, and the like.

As illustrated in FIG. 3, the PTO power transmitting system 24 includes a PTO clutch 56, a PTO transmission mechanism 57, a final transmitting shaft 58, and a relay gear train 59. The PTO power transmitting system 24 is accommodated inside the transmission case 14.

The PTO clutch 56 is a device that intermittently transmits power from the first transmitting shaft 29 (engine 8). The PTO clutch 56 transmits the power to the PTO transmission mechanism 57 in a clutch-connected state. For example, the PTO clutch 56 includes a wet multi-plate hydraulic clutch that transitions into a clutch-connected state by being supplied with oil (pressure oil) and that transitions into a clutch-disconnected state by discharging the oil. The PTO clutch 56 is supplied with or discharges the oil via an electromagnetic switching valve 60 as an electromagnetic switching valve. In other words, the PTO clutch 56 undergoes intermittent control of power by the electromagnetic switching valve 60.

Figure 6:
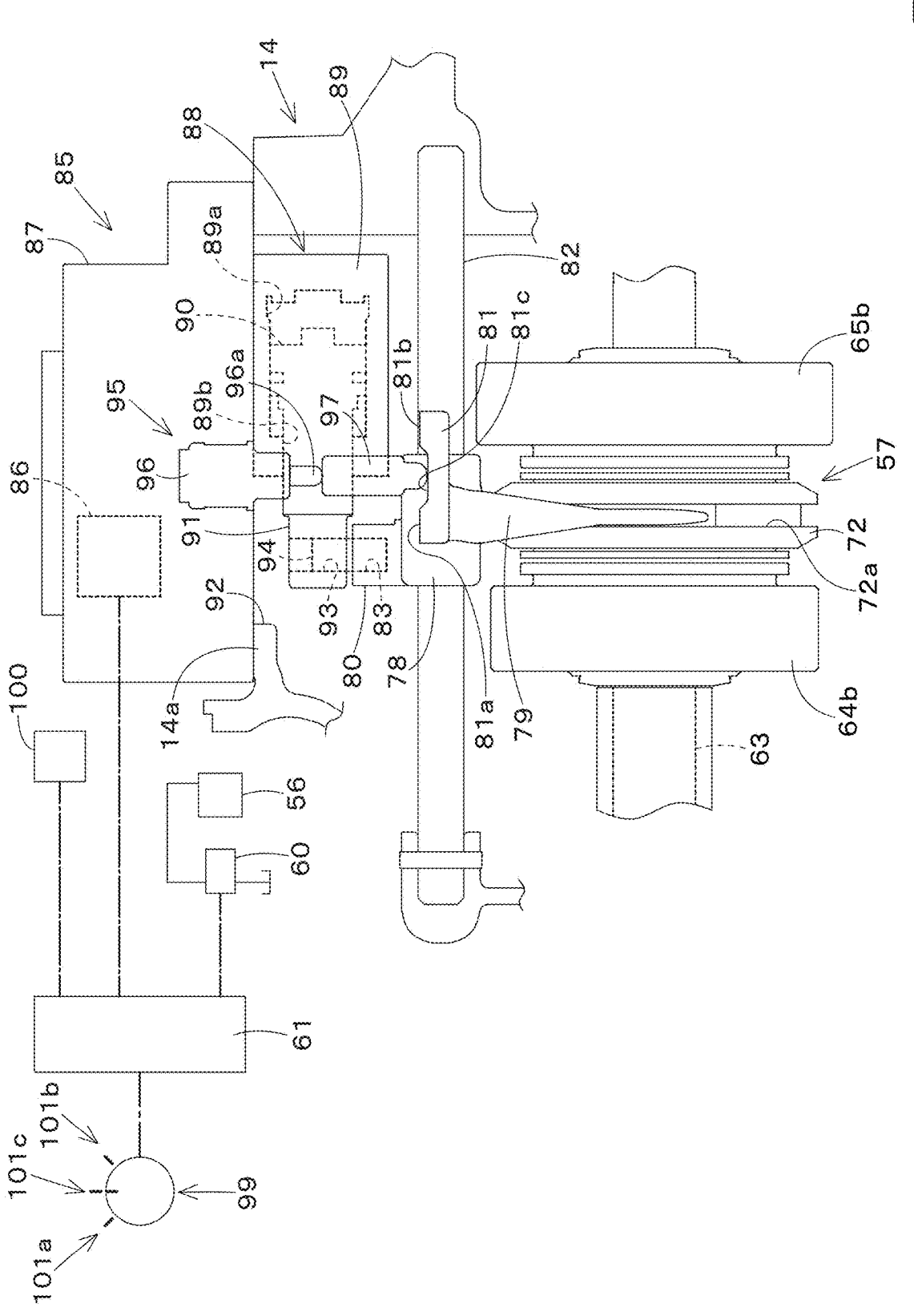

As illustrated in FIG. 6, the electromagnetic switching valve 60 is connected to a controller 61, and is controlled by the controller 61.

The PTO transmission mechanism 57 speed-changes the power transmitted via the PTO clutch 56. The PTO transmission mechanism 57 includes a first PTO transmission shaft 62, a second PTO transmission shaft 63, a first gear train 64 and a second gear train 65, and a switching mechanism 66.

The power from the first transmitting shaft 29 (engine 8) is transmitted to the first PTO transmission shaft 62 via the PTO clutch 56. The second PTO transmission shaft 63 transmits the power to the PTO shaft 9. The first gear train 64 and the second gear train 65 transmit the power from the first PTO transmission shaft 62 to the second PTO transmission shaft 63.

The first gear train 64 includes a driving gear 64a that rotates integrally with the first PTO transmission shaft 62, and a driven gear 64b that meshes with the driving gear 64a and that is fitted to the second PTO transmission shaft 63 in a relatively rotatable manner. The second gear train 65 includes a driving gear 65a that rotates integrally with the first PTO transmission shaft 62, and a driven gear 65b that meshes with the driving gear 65a and that is fitted to the second PTO transmission shaft 63 in a relatively rotatable manner.

The first gear train 64 transmits power to the PTO shaft 9 when the rotation speed of the engine 8 is a first rotation speed. The second gear train 65 transmits power to the PTO shaft 9 when the rotation speed of the engine 8 is a second rotation speed different from the first rotation speed. In this example embodiment, the second rotation speed is a rotation speed greater than the first rotation speed. Therefore, the second gear train 65 reduces the speed of rotational power of the first PTO transmission shaft 62 relative to the first gear train 64, and transmits the rotational power to the second PTO transmission shaft 63.

A gear ratio of the first gear train 64 and a gear ratio of the second gear train 65 are such that a rotation speed of the PTO shaft 9 when the rotation speed of the engine 8 is the first rotation speed is equal or substantially equal to a rotation speed of the PTO shaft 9 when the rotation speed of the engine 8 is the second rotation speed. By switching the rotation speed of the engine 8 from the first rotation speed to the second rotation speed, output horsepower to be output from the PTO shaft 9 can be increased while keeping the rotation speed of the PTO shaft 9 constant.

The switching mechanism 66 is a synchromesh switching mechanism configured to switch the power transmission from the first PTO transmission shaft 62 to the second PTO transmission shaft 63 between a first mode where the power transmission is performed via the first gear train 64 and a second mode where the power transmission is performed via the second gear train 65.

Figure 4:
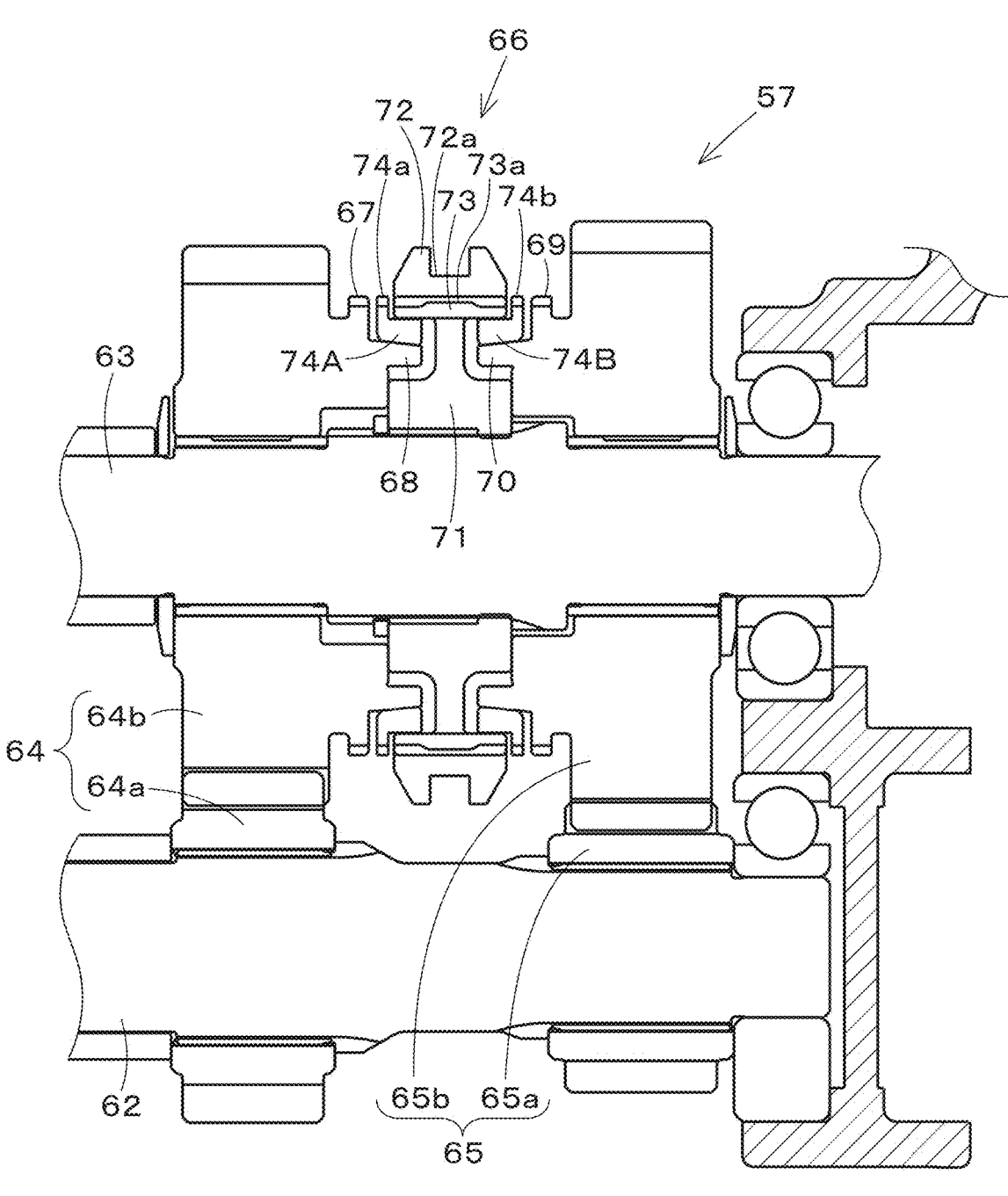
FIG. 4 is a cross-sectional view illustrating a PTO transmission mechanism.

As illustrated in FIG. 4, the switching mechanism 66 is disposed between a driven gear (referred to as a first driven gear) 64b of the first gear train 64 and a driven gear (referred to as a second driven gear) 65b of the second gear train 65. The first driven gear 64b is provided with a first spline portion 67 and a first cone portion 68 that is conical. The second driven gear 65b is provided with a second spline portion 69 and a second cone portion 70 that is conical.

The switching mechanism 66 includes a coupling 71, a shifter 72, at least one synchronizer key 73, and a pair of synchronizer rings 74A and 74B.

The coupling 71 is fitted to the second PTO transmission shaft 63 in an integrally rotatable manner. The shifter 72 is tubular and is fitted to the outer periphery of the coupling 71 by spline-fitting. Thus, the shifter 72 is rotatable integrally with the coupling 71 and is movable in the axial direction of the second PTO transmission shaft 63 relative to the coupling 71.

The at least one synchronizer key 73 includes a plurality of synchronizer keys 73 respectively fitted in a plurality of key grooves provided in the outer periphery of the coupling 71. A protrusion 73a of each synchronizer key 73 is fitted in a groove of the shifter 72, and the synchronizer key 73 is pressed against the shifter 72 by a spring.

One synchronizer ring (referred to as a first synchronizer ring) 74A of the pair of synchronizer rings 74A and 74B includes a spline portion 74a at the outer periphery thereof, and is disposed at the outer periphery of the first cone portion 68. The other synchronizer ring (referred to as a second synchronizer ring) 74B of the pair of synchronizer rings 74A and 74B includes a spline portion 74b at the outer periphery thereof, and is disposed at the outer periphery of the second cone portion 70.

Next, the operation of the switching mechanism 66 will be described.

When the shifter 72 receives a force applied in a direction that causes it to move to the first driven gear 64b, the shifter 72 starts to move toward the driven gear 64b. This causes the synchronizer key 73 pressed by the shifter 72 to press the first synchronizer ring 74A against the first cone portion 68. A frictional force generated between the first synchronizer ring 74A and the first cone portion 68 causes a start of transmission of the rotation of the coupling 71 and the synchronizer key 73 to the first synchronizer ring 74A and the first driven gear 64b.

When the shifter 72 is to move further, the shifter 72 and the synchronizer key 73 become disengaged from each other to cause the shifter 72 alone to move, so that the first synchronizer ring 74A and the shifter 72 come into contact with each other at chamfered portions of the respective splines. Accordingly, a frictional force received by the first synchronizer ring 74A in the rotational direction is also added to the force pressing against the first synchronizer ring 74A, and the combined force presses the first synchronizer ring 74A against the first cone portion 68. Consequently, the rotational speed of the first driven gear 64b becomes equal to that of the shifter 72. In other words, the rotational speeds synchronize between the first driven gear 64b and the shifter 72.

When the rotation of the shifter 72 and the rotation of the first driven gear 64b match (synchronize), the shifter 72 sequentially meshes with the first synchronizer ring 74A and the first spline portion 67. Accordingly, the rotational power of the first PTO transmission shaft 62 is transmitted to the second PTO transmission shaft 63 sequentially via the first driving gear, the first driven gear 64b, the shifter 72, and the coupling 71.

Since the same operation as above applies to a case where the shifter 72 is moved to the second driven gear 65b, the description will be omitted.

As illustrated in FIG. 3, the final transmitting shaft 58 rotates integrally with the PTO shaft 9. The relay gear train 59 transmits power output from the PTO transmission mechanism 57 to the final transmitting shaft 58.

As illustrated in FIG. 3, the PTO power transmitting system 24 includes a power extracting gear 75. The power extracting gear 75 is attached to the final transmitting shaft 58 in an integrally rotatable manner. Rotational power of the power extracting gear 75 is transmitted to a power extracting portion 102 via a gear transmitting mechanism 76. For example, the power extracting portion 102 is capable of transmitting power intermittently to a working machine, such as a mid-mount mower, attached to a lower portion of the tractor 1.

Figure 5:
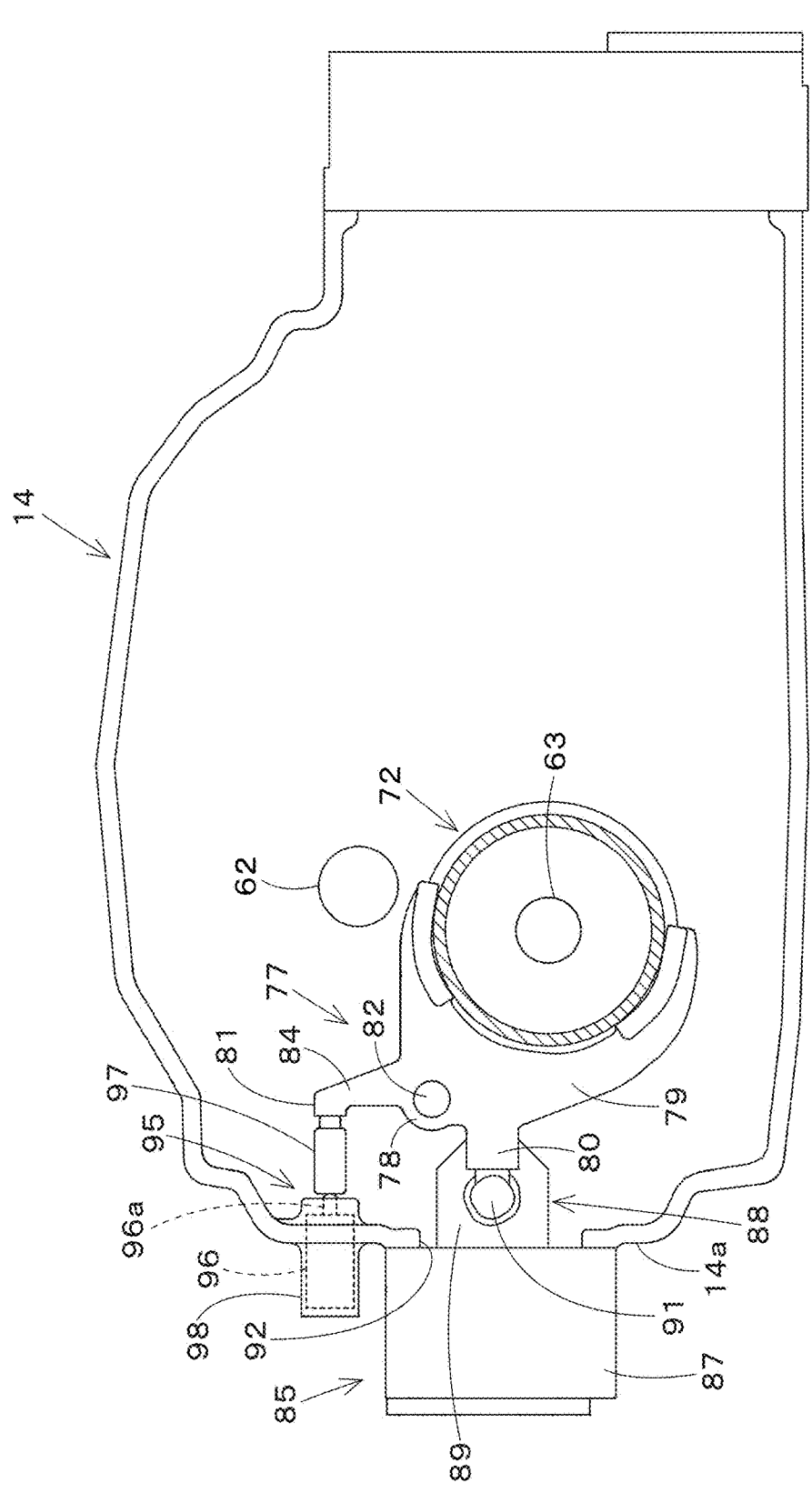

As illustrated in FIG. 5, the tractor 1 includes a shift fork 77 that performs a switching operation of the switching mechanism 66 to switch the power transmission from the first PTO transmission shaft 62 to the second PTO transmission shaft 63 to the first mode or the second mode.

As illustrated in FIGS. 5, 6, 7, and 8, the shift fork 77 includes a boss 78, a main body 79, a connector 80, and a detection portion 81. The boss 78 is supported by a support rod 82 in a slidable manner. The support rod 82 is disposed parallel to the second PTO transmission shaft 63 (see FIG. 6). Therefore, the shift fork 77 is movable in the axial direction of the second PTO transmission shaft 63. Opposite axial ends of the support rod 82 are supported by the transmission case 14.

The main body 79 is bifurcated and is engaged with an engagement groove 72a in the shifter 72. With the main body 79 being engaged with the shifter 72, the shift fork 77 and the shifter 72 are integrally movable. The base portion of the main body 79 is provided with the boss 78. The connector 80 is provided at the base portion of the main body 79. The connector 80 has a shape that protrudes rightward from the base portion. The connector 80 is located below the boss 78. The connector 80 includes a connection hole 83 that is open rightward.

The detection portion 81 is provided at an upper portion of an extending portion 84 extending upward from the boss 78. The detection portion 81 includes a first engagement portion 81a, a second engagement portion 81b, and a recess 81c at the right surface. The first engagement portion 81a is provided at the front of the detection portion 81. The second engagement portion 81b is provided at the rear of the detection portion 81. The recess 81c is provided between the first engagement portion 81a and the second engagement portion 81b.

Figure 7:
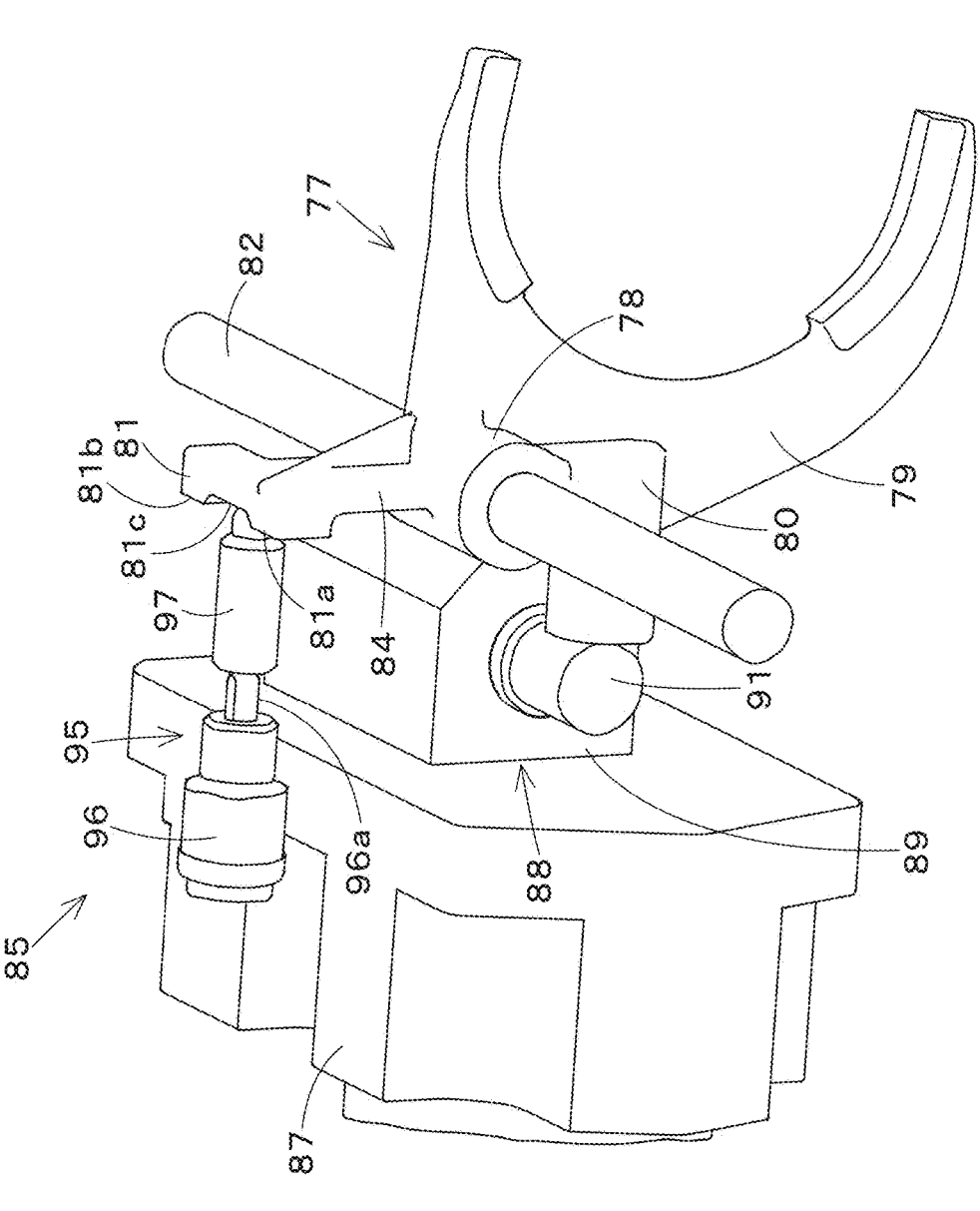
Figure 8:
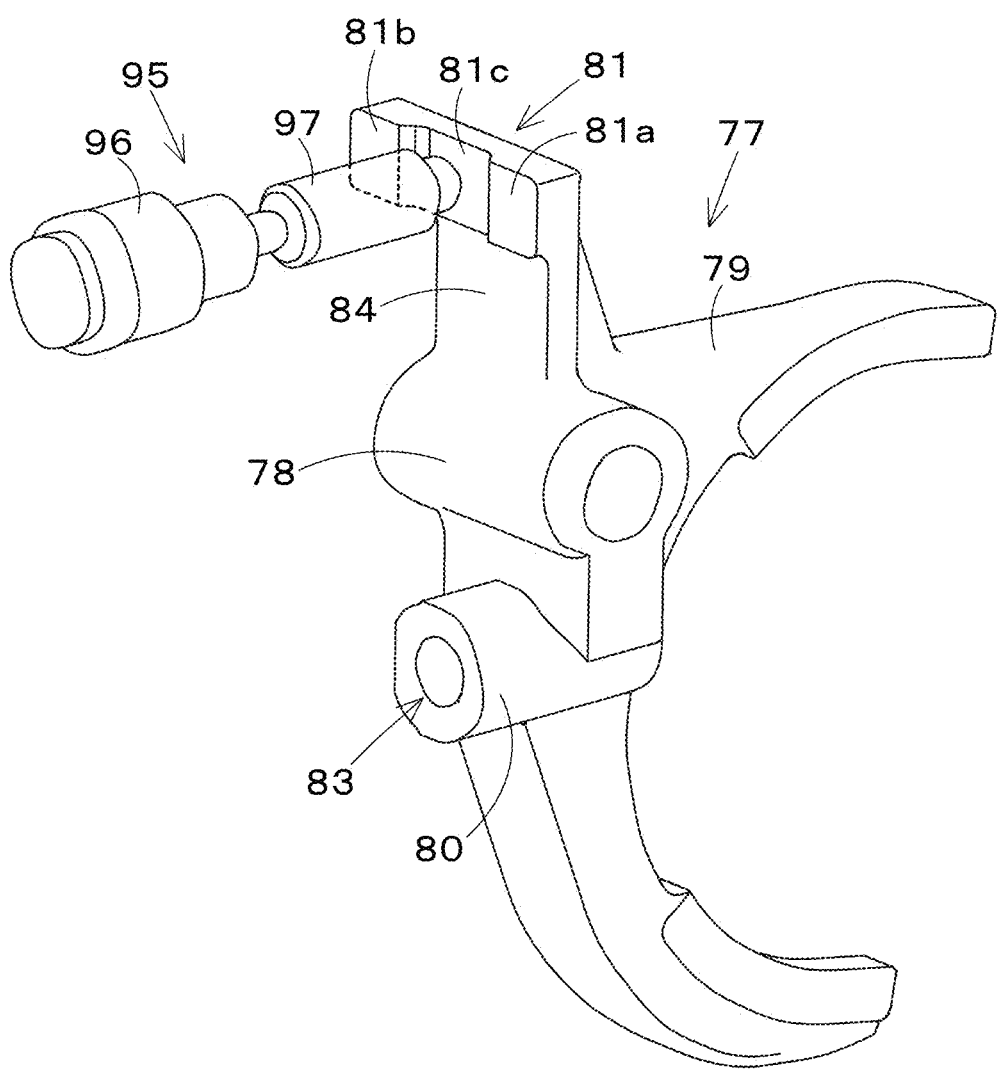
FIG. 8 is a perspective view illustrating the shift fork and a detection sensor.

As illustrated in FIGS. 5, 6, and 7, the tractor 1 includes an operation mechanism 85 to operate the shift fork 77 to perform the switching operation of the switching mechanism 66 by using the shift fork 77. As illustrated in FIGS. 5 and 6, the operation mechanism 85 is disposed rightward of the shift fork 77.

As illustrated in FIG. 6, the operation mechanism 85 includes a transmission valve 86, a main body 87, and a shift cylinder 88. The transmission valve 86 includes an electromagnetic valve. The transmission valve 86 is connected to the controller 61. The transmission valve 86 is operationally controlled in accordance with a control signal output from the controller 61.

The main body 87 contains the transmission valve 86 therein. The main body 87 includes a fluid passage to guide oil (pressure oil) supplied from a hydraulic pump equipped in the tractor 1 to the transmission valve 86 and the shift cylinder 88. The main body 87 is attached to an outer surface of a right sidewall 14a of the transmission case 14 (see FIG. 5).

The shift cylinder 88 moves the shift fork 77 to perform the switching operation of the switching mechanism 66. As illustrated in FIG. 6, the shift cylinder 88 includes a cylinder body 89, a piston 90, and a piston rod 91. The cylinder body 89 is provided at a left portion of the main body 87. The cylinder body 89 is integrally molded with the main body 87. Specifically, the main body 87 and the cylinder body 89 are a single-piece object. The cylinder body 89 is inserted into the transmission case 14 via an open hole 92 provided in the right sidewall 14a of the transmission case 14.

The cylinder body 89 includes a cylinder chamber 89a and a rod insertion hole 89b that communicates with a front portion of the cylinder chamber 89a and that is open forward. The piston 90 is movable in the front-rear direction K1 (direction parallel to the axis of the first PTO transmission shaft 62) inside the cylinder chamber 89*a*. The piston rod 91 is connected to the front surface of the piston 90 and is inserted through the rod insertion hole 89*b*. A pin insertion hole 93 is provided at the distal end of the piston rod 91. A connection pin 94 is inserted through the pin insertion hole 93 and a connection hole 83 in the shift fork 77. The piston rod 91 and the shift fork 77 are connected by the connection pin 94. By using the transmission valve 86 to control the supply and discharge of the oil to and from the cylinder chamber 89*a*, the piston rod 91 protrudes and retracts relative to the cylinder body 89. The protrusion and retraction of the piston rod 91 cause the shift fork 77 to move.

Figure 9:
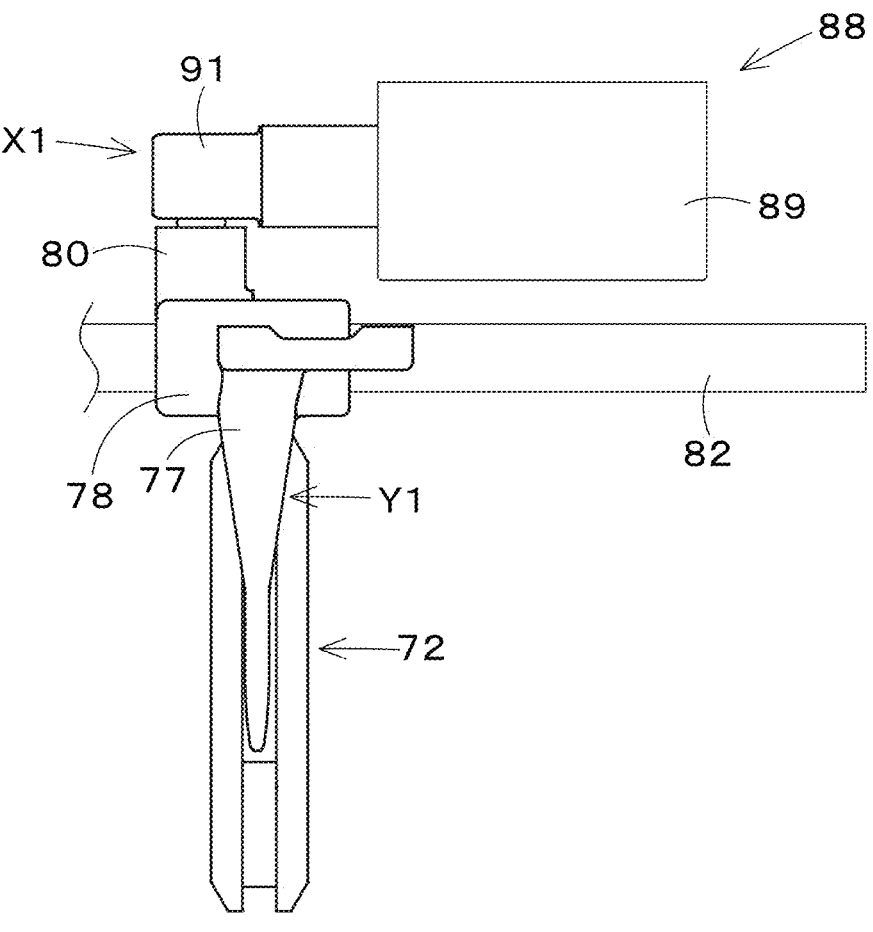
FIG. 9 is a plan view illustrating the operation of a shift cylinder and the position of the shift fork.
Figure 10:
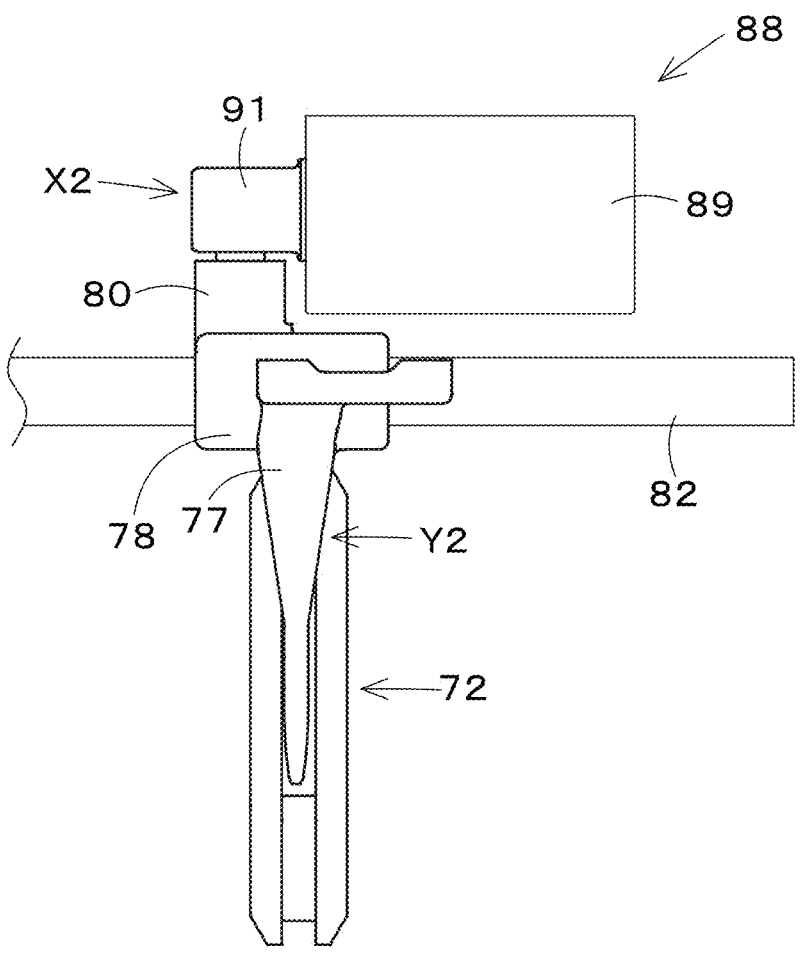
FIG. 10 is a plan view illustrating the operation of the shift cylinder and the position of the shift fork.

As illustrated in FIGS. 9 and 10, the piston 90 is switchable between a first shift position X1 (FIG. 9) and a second shift position X2 (FIG. 10) in accordance with the transmission valve 86.

As illustrated in FIG. 9, the first shift position X1 is a position where the shift fork 77 is moved to a first operational position Y1 and where the shifter 72 is meshed with the first spline portion 67 of the first driven gear 64*b*. Specifically, the first shift position X1 is a position where the power transmission from the first PTO transmission shaft 62 to the second PTO transmission shaft 63 has been switched to the first mode. In other words, the first operational position Y1 of the shift fork 77 is a position where the switching mechanism 66 has switched the power transmission from the first PTO transmission shaft 62 to the second PTO transmission shaft 63 to the first mode.

As illustrated in FIG. 10, the second shift position X2 is a position where the shift fork 77 is moved to a second operational position Y2 and where the shifter 72 is meshed with the second spline portion 69 of the second driven gear 65*b*. Specifically, the second shift position X2 is a position where the power transmission from the first PTO transmission shaft 62 to the second PTO transmission shaft 63 has been switched to the second mode. In other words, the second operational position Y2 of the shift fork 77 is a position where the switching mechanism 66 has switched the power transmission from the first PTO transmission shaft 62 to the second PTO transmission shaft 63 to the second mode.

As illustrated in FIGS. 5, 6, 7, and 8, the tractor 1 includes a detecting mechanism 95 that detects the position of the shift fork 77. The detecting mechanism 95 includes a detection sensor 96 and a pressing member 97. As illustrated in FIG. 5, the detection sensor 96 is retained by a retainer 98 provided at the sidewall 14*a* of the transmission case 14. The pressing member 97 is interposed between the detection sensor 96 and the detection portion 81 of the shift fork 77. The pressing member 97 is supported by a support, not illustrated, provided at the transmission case 14 in a movable manner in the vehicle-body width direction.

The pressing member 97 abuts on the first engagement portion 81*a* of the shift fork 77 so that the pressing member 97 presses and moves a contact 96*a* of the detection sensor 96, whereby the detection sensor 96 detects that the shift fork 77 is in a position (first operational position Y1) where the shifter 72 is meshed with the first spline portion 67. Moreover, the pressing member 97 abuts on the second engagement portion 81*b* of the shift fork 77 so that the pressing member 97 presses and moves the contact 96*a* of the detection sensor 96. As a result, the detection sensor 96 detects that the shift fork 77 is in a position (second operational position Y2) where the shifter 72 is meshed with the second spline portion 69.

Accordingly, the shift fork 77 includes the detection portion 81 that is movable between the first operational position Y1 and the second operational position Y2 and that causes the detection sensor 96 to detect that the shift fork 77 is in the first operational position Y1 or the second operational position Y2.

The detecting mechanism 95 may include the detection sensor 96 alone. In this case, the contact 96*a* of the detection sensor 96 is brought into abutment with the detection portion 81.

As illustrated in FIG. 6, the tractor 1 includes a transmission switch (switch) 99. The transmission switch 99 is disposed near the operator's seat 2. The transmission switch 99 is operable to output at least an operational signal to operate the operation mechanism 85. In this example embodiment, the transmission switch 99 outputs an operational signal to switch the rotation speed of the engine 8 and to operate the operation mechanism 85. The transmission switch 99 is connected to the controller 61. The controller 61 is capable of acquiring the operational signal output from the transmission switch 99. The controller 61 is also connected to an engine control unit (ECU) 100 that controls the rotation speed of the engine 8.

The transmission switch 99 includes a rotary switch manually rotated by the operator. The transmission switch 99 is switchable among a first position 101*a*, a second position 101*b*, and a third position 101*c*.

When the transmission switch 99 is switched (operated) to the first position 101*a*, the controller 61 acquires the operational signal from the transmission switch 99 and outputs a control signal (first control signal) to the ECU 100 and the operation mechanism 85 (transmission valve 86). Upon acquiring the first control signal, the ECU 100 switches the rotation speed of the engine 8 to the first rotation speed and fixes the rotation speed to the first rotation speed. Upon acquiring the first control signal, the operation mechanism 85 (transmission valve 86) actuates the shift cylinder 88 to move the shift fork 77 to the first operational position Y1, and switches the switching mechanism 66 such that the power transmission from the first PTO transmission shaft 62 to the second PTO transmission shaft 63 is in the first mode.

When the transmission switch 99 is switched (operated) to the second position 101*b*, the controller 61 acquires the operational signal from the transmission switch 99 and outputs a control signal (second control signal) to the ECU 100 and the operation mechanism 85 (transmission valve 86). Upon acquiring the second control signal, the ECU 100 switches the rotation speed of the engine 8 to the second rotation speed and fixes the rotation speed to the second rotation speed. Upon acquiring the second control signal, the operation mechanism 85 (transmission valve 86) actuates the shift cylinder 88 to move the shift fork 77 to the second operational position Y2, and switches the switching mechanism 66 such that the power transmission from the first PTO transmission shaft 62 to the second PTO transmission shaft 63 is in the second mode.

When the transmission switch 99 is switched to the third position 101*c*, the controller 61 acquires the operational signal from the transmission switch 99 and outputs a control signal (third control signal) to the ECU 100. Upon acquiring the third control signal, the ECU 100 does not fix the rotation speed of the engine 8 to a specific rotation speed. In this case, for example, the rotation speed of the engine 8 is controlled to a rotation speed set in accordance with an operation of an accelerator member manually operated by the operator. The controller 61 does not output a control signal to the operation mechanism 85 (transmission valve 86) when the transmission switch 99 is switched to the third position 101c. Specifically, the switching mechanism 66 is not switched to a neutral position.

For example, when the transmission switch 99 is switched to the third position 101c, the electromagnetic switching valve 60 may acquire a third control signal, and the PTO clutch 56 may be switched to the clutch-disconnected state by the electromagnetic switching valve 60. The PTO clutch 56 may be switched between the clutch-connected state and the clutch-disconnected state in accordance with an operation by the operator different from the operation of the transmission switch 99.

The example embodiments of the present invention provide the working vehicles according to the following items.

(Item 1) A working vehicle including a PTO shaft to extract power of a prime mover to an outside, a first PTO transmission shaft to receive power from the prime mover, a second PTO transmission shaft to transmit power to the PTO shaft, a first gear train and a second gear train to transmit power from the first PTO transmission shaft to the second PTO transmission shaft, and a synchromesh switching mechanism to switch power transmission from the first PTO transmission shaft to the second PTO transmission shaft between a first mode where the power transmission is performed via the first gear train and a second mode where the power transmission is performed via the second gear train.

In the working vehicle 1 according to item 1, the synchromesh switching mechanism 66 is configured to switch the power transmission from the first PTO transmission shaft 62 to the second PTO transmission shaft 63 between the first mode where the power transmission is performed via the first gear train 64 and the second mode where the power transmission is performed via the second gear train 65, such that the transmission operation of the PTO power transmitting system can be performed by electronic control using a switch.

(Item 2) The working vehicle according to Item 1, further including a shift fork to perform a switching operation of the synchromesh switching mechanism to switch the power transmission between the first mode and the second mode, an operation mechanism to operate the shift fork to cause the shift fork to perform the switching operation of the synchromesh switching mechanism, a switch operable to output an operational signal to operate the operation mechanism, and a controller configured or programmed to, when acquiring the operational signal from the switch, output a control signal to actuate the operation mechanism.

In the working vehicle 1 according to item 2, the operation mechanism 85 is actuated in accordance with the control signal output from the controller 61 by operating the switch 99, and the switching operation of the synchromesh switching mechanism 66 is performed by operating the shift fork 77 using the operation mechanism 85, such that the transmission operation of the PTO power transmitting system can be performed by electronic control using a switch.

(Item 3) The working vehicle according to item 1 or 2, wherein the first gear train is configured to transmit the power to the PTO shaft when a rotation speed of the prime mover is a first rotation speed, the second gear train is configured to transmit the power to the PTO shaft when the rotation speed of the prime mover is a second rotation speed different from the first rotation speed, and a gear ratio of the first gear train and a gear ratio of the second gear train are such that a rotation speed of the PTO shaft when the rotation speed of the prime mover is the first rotation speed is equal or substantially equal to a rotation speed of the PTO shaft when the rotation speed of the prime mover is the second rotation speed.

In the working vehicle 1 according to item 3, when the rotation speed of the engine 8 is switched from a lower one of the first and second rotation speeds to a higher one of the first and second rotation speeds, the output horsepower to be output from the PTO shaft 9 can be increased while keeping the rotation speed of the PTO shaft 9 constant.

(Item 4) The working vehicle according to item 3 as dependent on item 2, wherein the controller is configured or programmed to, when acquiring the operational signal from the switch, switch the rotation speed of the prime mover to the first rotation speed or the second rotation speed and output the control signal to the operation mechanism to switch the power transmission to the first mode or the second mode depending on whether the rotation speed of the prime mover is the first rotation speed or the second rotation speed.

In the working vehicle 1 according to item 4, the switching between the first mode and the second mode can be performed automatically in conjunction with the switching between the first rotation speed and the second rotation speed by operating the switch 99.

(Item 5) The working vehicle according to item 2 or item 3 or 4 as dependent on claim 2, wherein the operation mechanism includes a shift cylinder to move the shift fork to perform the switching operation, and a transmission valve to be controlled in accordance with the control signal to actuate the shift cylinder.

In the working vehicle 1 according to item 5, the switching between the first mode and the second mode can be performed automatically in accordance with the shift cylinder 88 that moves the shift fork 77 and the transmission valve 86 that actuates the shift cylinder 88.

(Item 6) The working vehicle according to item 5, wherein the shift cylinder includes a cylinder body and a piston rod to protrude and retract relative to the cylinder body, and the shift fork includes a connector to be connected to the piston rod via a connection pin.

In the working vehicle 1 according to item 6, a moving operation of the shift fork 77 can be performed in accordance with the shift cylinder 88.

(Item 7) The working vehicle according to item 2 or any one of items 3, 4, 5, and 6 as dependent on item 2, further including a detection sensor to detect a position of the shift fork, wherein the shift fork includes a detectable portion that is movable between a first operational position and a second operational position and is to be detected by the detection sensor to enable the detection sensor to detect whether the shift fork is in the first operational position or the second operational position, the first operational position is a position where the power transmission from the first PTO transmission shaft to the second PTO transmission shaft is switched to the first mode by the synchromesh switching mechanism, and the second operational position is a position where the power transmission from the first PTO transmission shaft to the second PTO transmission shaft is switched to the second mode by the synchromesh switching mechanism.

In the working vehicle 1 according to item 7, it is possible to detect whether the power transmission from the first PTO transmission shaft 62 to the second PTO transmission shaft 63 is in the first mode or the second mode.

While example embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A working vehicle comprising:
a PTO shaft to extract power of a prime mover;
a first PTO transmission shaft to receive power from the prime mover;
a second PTO transmission shaft to transmit power to the PTO shaft;
a first gear train and a second gear train to transmit power from the first PTO transmission shaft to the second PTO transmission shaft;
a synchromesh switching mechanism to switch power transmission from the first PTO transmission shaft to the second PTO transmission shaft between a first mode where the power transmission is performed via the first gear train and a second mode where the power transmission is performed via the second gear train;
a shift fork to perform a switching operation of the synchromesh switching mechanism to switch the power transmission between the first mode and the second mode;
an operation mechanism to operate the shift fork to cause the shift fork to perform the switching operation of the synchromesh switching mechanism;
a switch operable to output an operational signal to operate the operation mechanism; and
a controller configured or programmed to, when acquiring the operational signal from the switch, output a control signal to actuate the operation mechanism.

2. The working vehicle according to claim 1, wherein
the first gear train is configured to transmit the power to the PTO shaft when a rotation speed of the prime mover is a first rotation speed;
the second gear train is configured to transmit the power to the PTO shaft when the rotation speed of the prime mover is a second rotation speed different from the first rotation speed;
the controller is configured or programmed to, when acquiring the operational signal from the switch, switch the rotation speed of the prime mover to the first rotation speed or the second rotation speed and output the control signal to the operation mechanism to switch the power transmission to the first mode or the second mode depending on whether the rotation speed of the prime mover is the first rotation speed or the second rotation speed.

3. The working vehicle according to claim 1, wherein the operation mechanism includes:
a shift cylinder to move the shift fork to perform the switching operation;
and a transmission valve to be controlled in accordance with the control signal to actuate the shift cylinder.

4. The working vehicle according to claim 3, wherein the shift cylinder includes a cylinder body and a piston rod to protrude and retract relative to the cylinder body; and the shift fork includes a connector to be connected to the piston rod via a connection pin.

5. The working vehicle according to claim 1, further comprising:
a detection sensor to detect a position of the shift fork;
wherein the shift fork includes:
a detectable portion that is movable between a first operational position and a second operational position and is to be detected by the detection sensor to enable the detection sensor to detect whether the shift fork is in the first operational position or the second operational position;
the first operational position is a position where the power transmission from the first PTO transmission shaft to the second PTO transmission shaft is switched to the first mode by the synchromesh switching mechanism; and
the second operational position is a position where the power transmission from the first PTO transmission shaft to the second PTO transmission shaft is switched to the second mode by the synchromesh switching mechanism.

6. A working vehicle comprising:
a PTO shaft to extract power of a prime mover;
a first PTO transmission shaft to receive power from the prime mover;
a second PTO transmission shaft to transmit power to the PTO shaft;
a first gear train and a second gear train to transmit power from the first PTO transmission shaft to the second PTO transmission shaft; and
a synchromesh switching mechanism to switch power transmission from the first PTO transmission shaft to the second PTO transmission shaft between a first mode where the power transmission is performed via the first gear train and a second mode where the power transmission is performed via the second gear train,; wherein
the first gear train is configured to transmit the power to the PTO shaft when a rotation speed of the prime mover is a first rotation speed;
the second gear train is configured to transmit the power to the PTO shaft when the rotation speed of the prime mover is a second rotation speed different from the first rotation speed; and
a gear ratio of the first gear train and a gear ratio of the second gear train are such that a rotation speed of the PTO shaft when the rotation speed of the prime mover is the first rotation speed is equal or substantially equal to a rotation speed of the PTO shaft when the rotation speed of the prime mover is the second rotation speed.

* * * * *